United States Patent

Duwaer et al.

[11] Patent Number: 5,959,627
[45] Date of Patent: Sep. 28, 1999

[54] METHOD AND DEVICE FOR USER-PRESENTATION OF A COMPILATION SYSTEM

[75] Inventors: Arne L. Duwaer; Rudi Blok; Petrus J. Kunst, all of Eindhoven, Netherlands

[73] Assignee: U.S. Philips Corporation, New York, N.Y.

[21] Appl. No.: 08/982,881

[22] Filed: Dec. 2, 1997

[30] Foreign Application Priority Data

Dec. 11, 1996 [EP] European Pat. Off. .............. 96203505

[51] Int. Cl.$^6$ .............................. G09G 3/02; G06F 17/00
[52] U.S. Cl. ........................ 345/345; 345/334; 345/340; 345/350
[58] Field of Search .................................. 345/326, 976, 345/340, 345, 334, 342, 350

[56] References Cited

U.S. PATENT DOCUMENTS

| | | | |
|---|---|---|---|
| 5,148,154 | 9/1992 | MacKay et al. ......................... | 345/340 |
| 5,388,264 | 2/1995 | Tobias, II et al. ...................... | 395/650 |
| 5,511,002 | 4/1996 | Milne et al. ............................ | 345/327 |
| 5,542,040 | 7/1996 | Chang et al. ........................... | 345/326 |
| 5,659,793 | 8/1997 | Escobar et al. ......................... | 345/302 |
| 5,680,323 | 10/1997 | Barnard ................................... | 345/327 |
| 5,680,619 | 10/1997 | Gudmundson et al. ................ | 395/701 |

FOREIGN PATENT DOCUMENTS 9612238  4/1996  WIPO ............................. G06F 17/30

OTHER PUBLICATIONS

"Effectief werken met Microsoft Office voor Windows 95" versie 7.0, pp. 540–543.

Primary Examiner—Mark K. Zimmerman
Assistant Examiner—David E. Brown
Attorney, Agent, or Firm—Gregory L. Thorne

[57] ABSTRACT

For visual user-presentation of a compilation system for multiple audio and/or visual items each item is associated with various attributes that each express a category, a value, or a label, and through selection among the items produces a compiled subset of items. In particular, the presentation is multidimensional in parallel over the various attributes, that each allow said selection therein on a uniform level. Through each selection presentation of items that discord with the actual selection is suppressed, so that each selection diminishes the multidimensionality of said presentation. Furthermore, a selection of effectivity controls is displayed.

11 Claims, 8 Drawing Sheets

METHOD AND DEVICE FOR USER-PRESENTATION OF A COMPILATION SYSTEM

BACKGROUND OF THE INVENTION

The invention relates to a method for visual user-presentation of a compilation system for multiple audio and/or visual items wherein the items are associated with various attributes that each specify a category, a value, or a label, for through selection amongst the items producing a compiled subset of items. The making of audio compilations is an old art that came into being with the manufacture of inexpensive recordable media, so that it became feasible to record a sequence of audio items, particularly but not restrictively songs, by choosing among various audio sources, or among various instances within a single source. The source may be actual, such as broadcast, but the problem of selecting becomes extremely relevant if the source is a large database of recordings, such as on background disk or tape, be it magnetic, optical, or other. The organizing can be done on the basis of menus, but the present invention has recognized such as being tedious and confusing to a user person.

SUMMARY OF THE INVENTION

In consequence, amongst other things, it is an object of the present invention to simplify the method according to the preamble, that allows for fast and carefree compiling in a database that may easily run into many hundreds of audio items. Now therefore, according to one of its aspects, the invention is characterized in that said presentation is effected multidimensionally in parallel over said various attributes, that each allow said selection therein on a uniform level, for through each selection suppressing presentation of items that discord with the actual selection, so that each selection diminishes the multidimensionality of said presentation, whilst furthermore displaying a selection of effectivity controls. In particular, it has been found that the sequence of selecting operations for a particular item is shorter now, and moreover, said presentation is invariant against an interchange of the actual sequence of a particular set of sequential selections. This further simplifies the operation by an inexperienced user. In general, the invention applies to audio items, video items, as well as mixed items. Often, the number of items remaining selectable reduces to one after only two or three selecting operations.

Advantageously, the invention allows selection by pointing as well as through associative search. The associative searching is particularly useful for names of well-known artists.

Advantageously, said presentation highlights attribute instances of a uniquely selected said item. This easily visualizes that the selection procedure is finished.

The invention also relates to a system arranged for implementing a method according to the above. Advantageously, a device is based on a two-level storage of said items, in that a relatively small part of each respective item is stored in foreground storage for relatively fast outputting that part to a user as compared to background storage. This allows a user to quickly recognize the item, and also allows to bridge any storage latency of background storage when the whole item must be reproduced. Various further advantageous aspects of the invention are recited in dependent Claims.

BRIEF DESCRIPTION OF THE DRAWING

These and other aspects and advantages of the invention will be discussed more in detail hereinafter with reference to the disclosure of preferred embodiments, and more in particular with reference to the appended Figures that show.

DETAILED DESCRIPTION OF PREFERRED EMBODIMENTS

Figure 1:
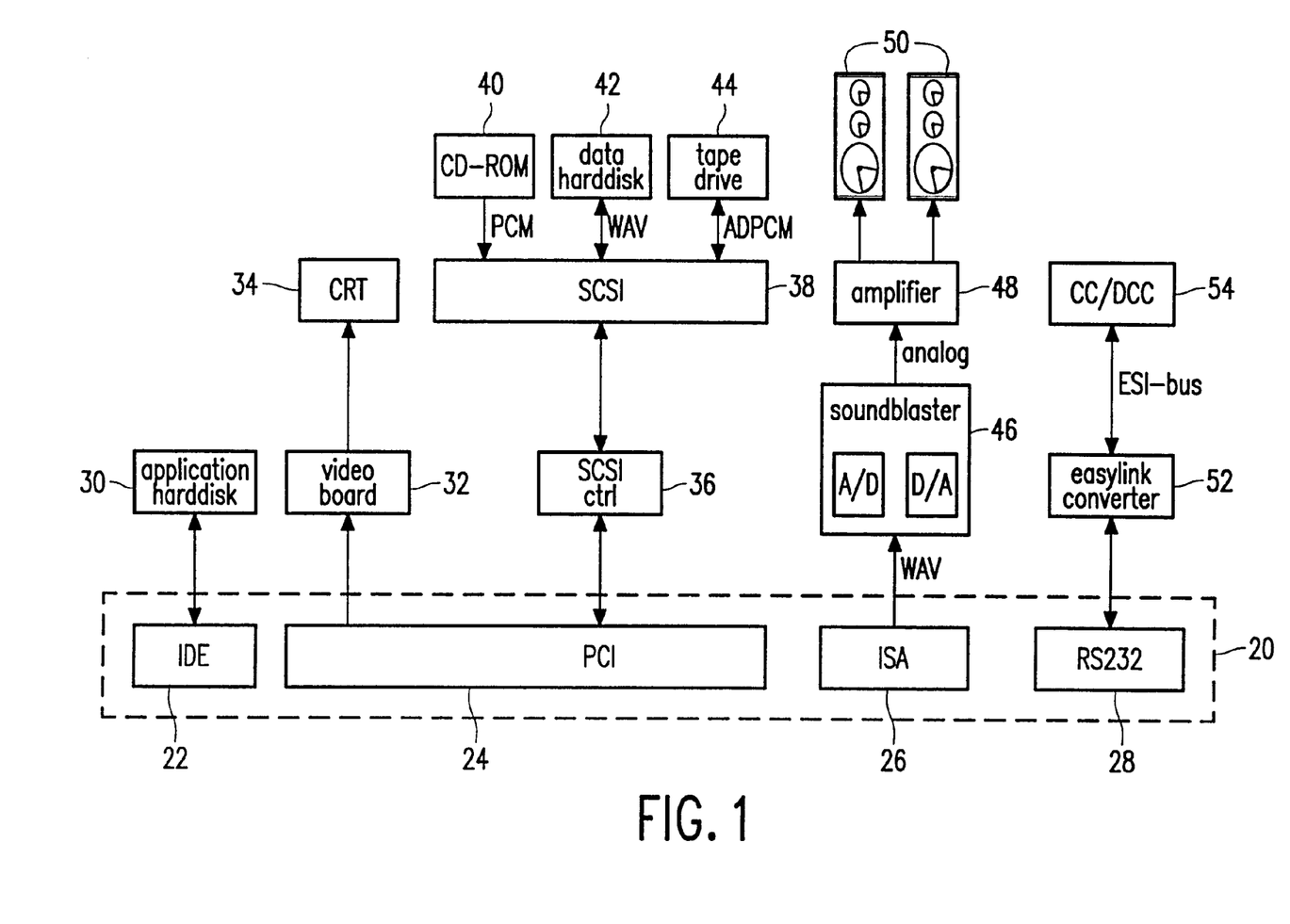
FIG. 1, an overview of a hardware architecture.

FIG. 1 is an overview of an exemplary hardware architecture, based on a personal computer environment, and on audio items. For video items, the organization can be comparable, although the required storage space and path throughput will be much greater. Generally, PC's are abundant, so the description hereinafter is only marginal. In the diagram, PC motherboard 20 carries standard hardware, inclusive of processor and cached RAM, interfacing to keyboard and mouse, not shown, and has four interfaces to external facilities:

IDE interface 22 to application hard disk 30 that carries operating system and associated programs PCI interface 24 to video board 32 and CRT 34, furthermore SCSI control 36 to SCSI interface 38, the latter interfacing to CD-ROM 40, data harddisk 42, and tape drive 44; the signal types PCM, WAV, and ADPCM have been specifically indicated;

ISA-interface 26, connecting soundblaster board 46 with analog amplifier 48 and loudspeaker set 50; and RS232 interface 28, to easylink bus converter 52 and Compact Cassette or DCC deck 54.

Generally, all of the above are conventional devices, or may be exchanged for other conventional devices with the same or similar functionality. The data harddisk 42 is used for various types of intermediate storage for the audio items. CRT 34 is used for displaying in a WINDOWS-like format various selection possibilities to a user as will be discussed more in detail with reference to FIGS. 2 to 6. Tape drive 44 represents a multi-gigabyte background storage for audio items. Compact Cassette and Digital Compact Cassette 54 elements represent further sources for the audio. The further elements are standard for a Small Computer environment.

Figure 2:
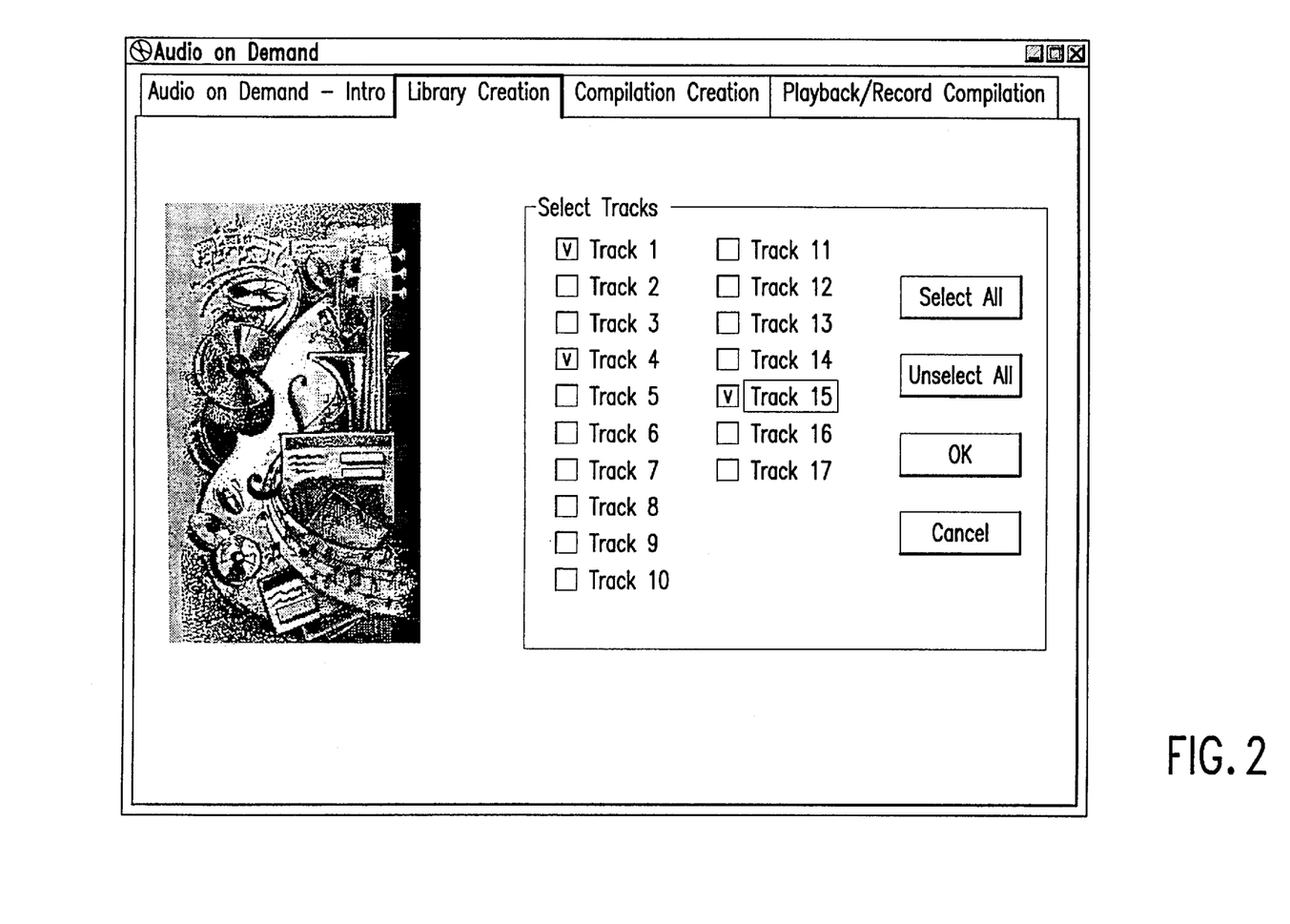
FIG. 2, a layout example of a "select track tab"

FIG. 2 is a layout example of a "select tracks tab", that is used for creating a library in the database, cf. the activated control element at the top of the Figure. Of the general appearance of the Figure, various aspects, such as the logo, have been derived from the book (in Dutch) 'Effektief Werken met Microsoft Office voor Windows 95', versie 7.0, p. 540–543. Corresponding versions of this book have been published in many other languages. Apparently, some audio carrier has been presented to the system, in this case a Compact Disk that has seventeen tracks, each track corresponding to one audio item. Through mousepointing, the user can Select the items for storage. Particular effectivity buttons at right may Select All items, Unselect All, Cancel to return to a previous state of the system, and OK the selection as executed.

Figure 3:
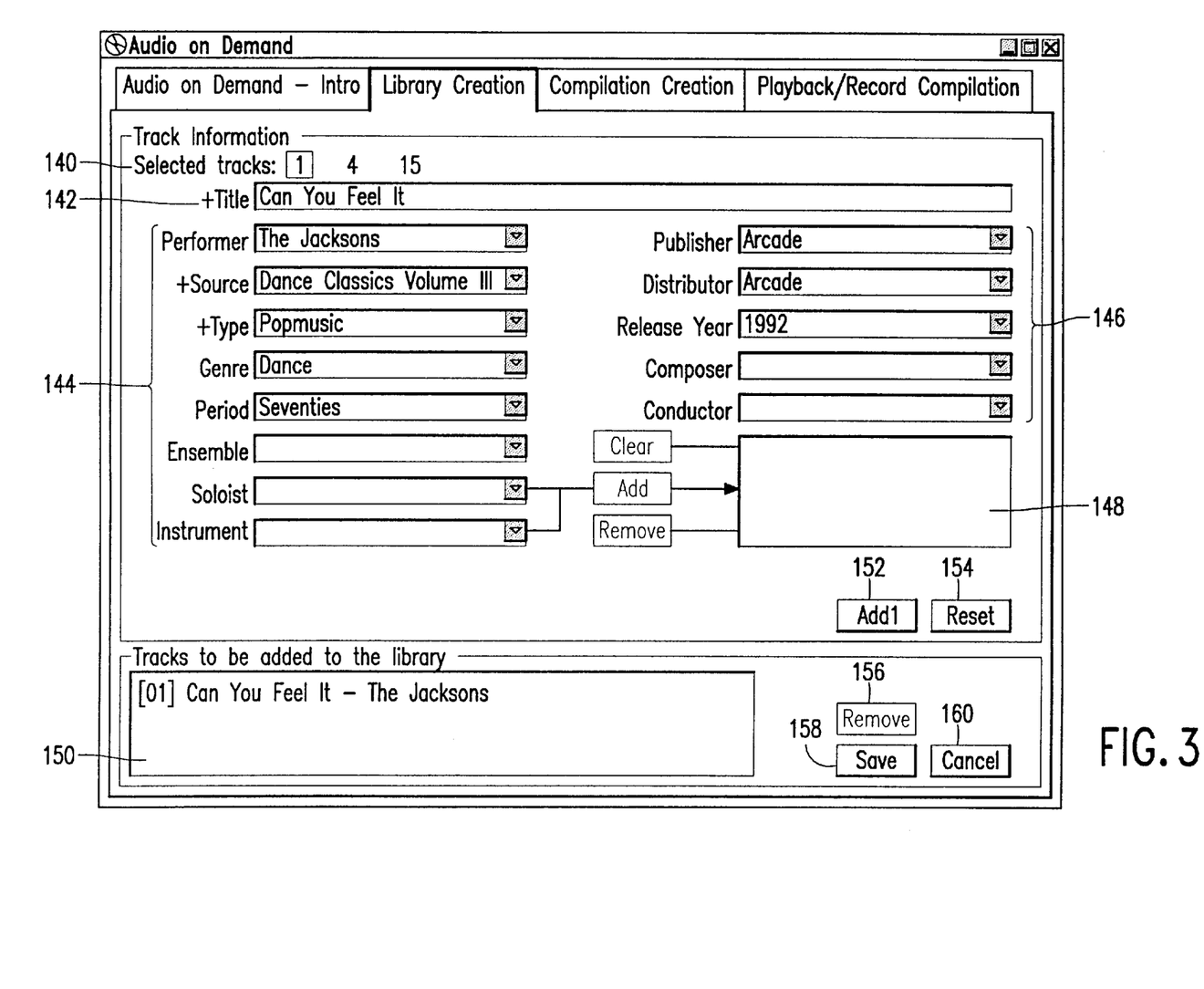
FIG. 3, ditto of an "input track information tab"

FIG. 3 is a layout of an "input track information tab", that is used after the selection according to FIG. 2 has been effected. Actual selection corresponds to the carrier situation shown in FIG. 2. Field 140 specifies the tracks selected in FIG. 2, and highlights one thereof for further specifying. Field 142 specifies the title of the highlighted track. Fields 144 successively specify the performer, the source, the type, the genre, the period, the ensemble, the soloist person and the solo instrument. Fields 146 specify successively the publisher, the distributor, the release year, the composer and the conductor. The contents of these fields can be inputted through typing on the PC keyboard. In certain circumstances the data in question may be derived from the medium itself, such as from a table of contents.

Alternatively, certain fields can be specified by a 'droplist' that has a restricted set of prestored items, such as the genre or period. The fields indicated by a (+)-plus sign must be filled in, because otherwise the item cannot be added to the database in a meaningful way. Other fields may or may not be left empty. If the mandatory amount of information has been added, the Add1 button becomes active. The Reset button resets the information displayed. It is possible to introduce various soloists at a time into field 148, together with their instruments; as shown, field 148 is associated to three effectivity control buttons Clear, Add and Remove, for introducing such additional information. In principle, field 148 can be used for inserting another type of user information, that can later be searched in an associative manner.

After completely specifying the information pertaining to a particular item, button 152 controls the adding of that item to the list of tracks to be added to the library: thereupon, certain pertinent informations will be displayed in field 150 in the sequence they were entered. Alternatively, button 154 may reset the content of fields 142–148. As regarding the list in field 150, button 156 may still remove a particular item or track, button 158 may finalize the addition of the tracks displayed to the library. Alternatively, button 160 may cancel a particular track from the list in field 150. In addition to the active control buttons discussed herebefore, various inactive control buttons can be only accessed restrictively, for example, light-coloured buttons cannot be accessed at all.

Figure 4:
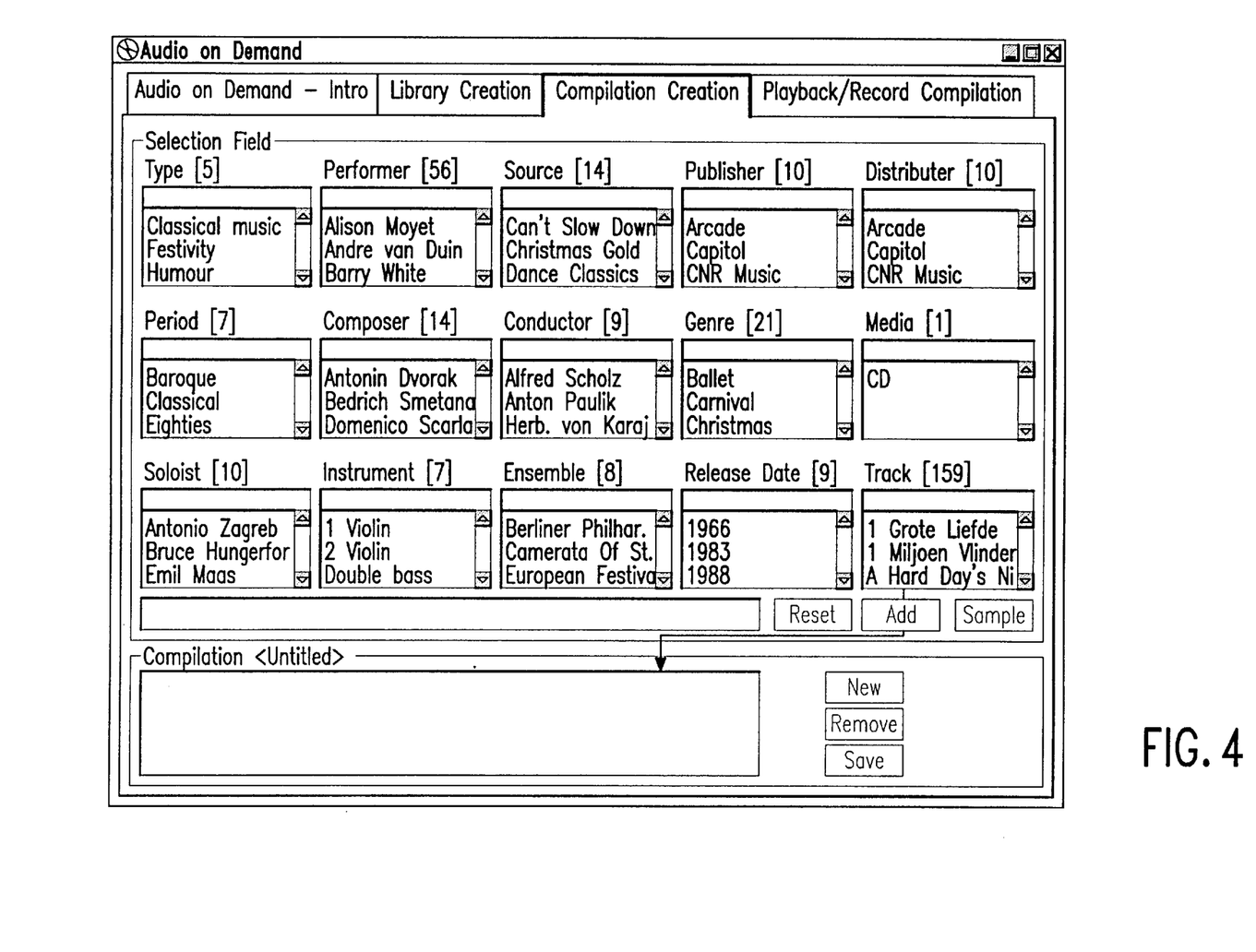
FIG. 4, ditto of a "compilation creation tab"

FIG. 4 is a layout example of a compilation creation tab. A prerequisite for attaining the desired functionality is effecting the storage of a sufficient number of audio items on tape drive 44 in FIG. 1, combined with storing attribute data of these items on disk 42. If required, disk 42 may also contain a relatively small initial part of the audio item itself, for example for bridging the access delay of tape drive 44, or any other relevant information that can be used as an audio cue. In the case of a video item, the relatively small part of the video may be a single image.

The main part of the display now relates to the stored audio items. As shown, the items have fifteen attributes: type, performer, source (album name or the like), publisher, distributor, period, composer, conductor, genre, type of medium, soloist, instrument, ensemble, release date, and track name. For each audio item stored, for various ones of these attributes a specifier has also been stored that indicates an applicable category, a value, or a label. A category may relate to type categories, genre categories, medium categories, personal categories, or organizational categories. A value may relate to a date. A label may indicate a personal or entity name. For each attribute the number of different possibilities has been shown. The largest value shown is the number of track names; note that it is possible that different tracks have the same name. For each attribute, the first three possibilities have been displayed. The internal stringing may be alphabetical, according to the value of the attribute, or according to some sequence that is felt as appropriate or is standard. As shown by arrows, each of the attribute fields is individually scrollable.

The top line of the display contains four selection controls that may respectively be activated for giving an introduction to a novice user, for creating a library, for creating a compilation (actually shown), and for effecting a playback or recording session of the compilation. The effectivity control buttons in the lower right hand corner will be discussed with reference to FIG. 5.

Figure 5:
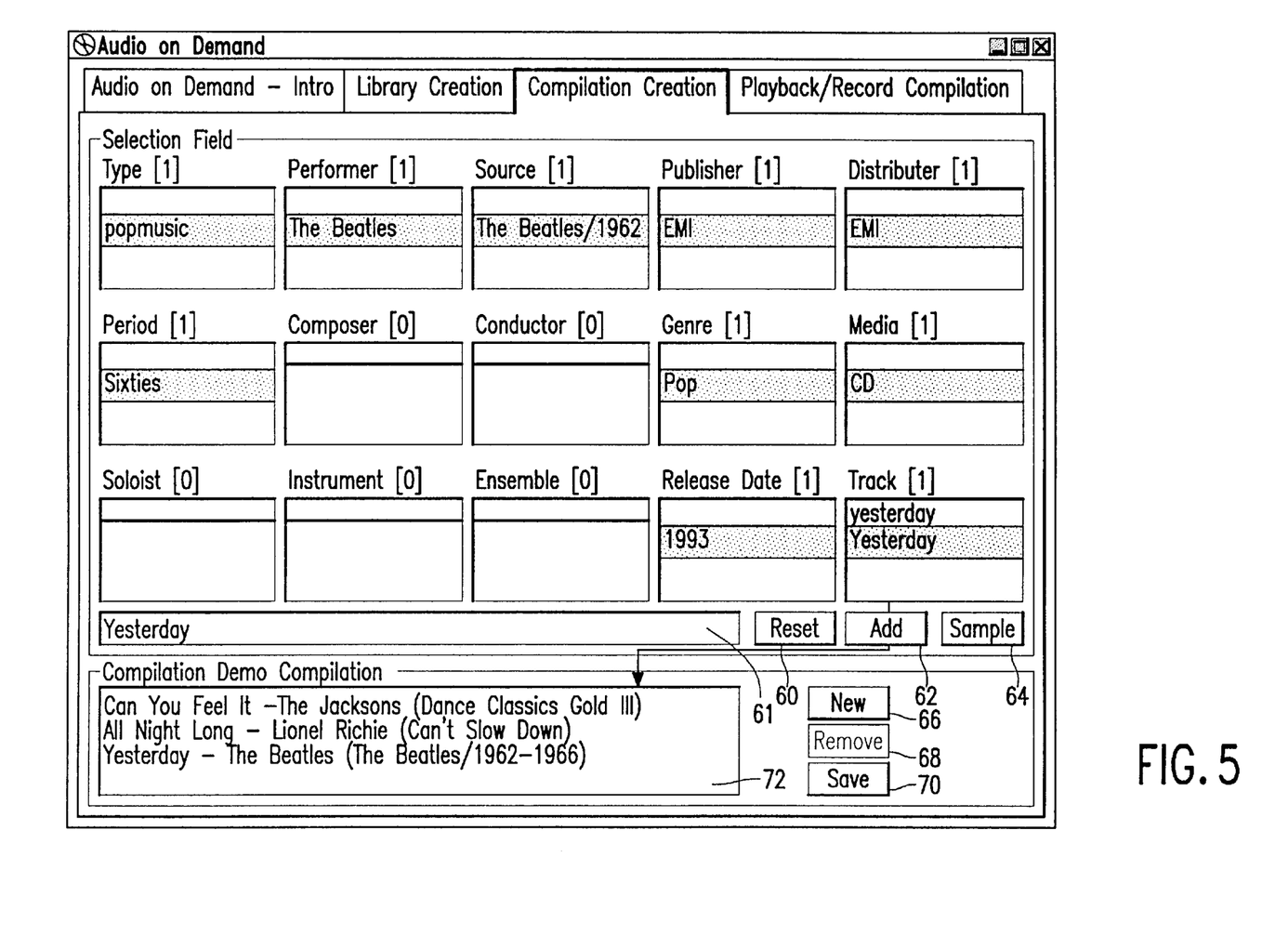
FIG. 5, the same after making a selection.

FIG. 5 is a layout example after a selection had been made of the same compilation creation tab. The selecting has been effected by mousepointing and clicking on any of the lines in the attribute display of FIG. 4. Such clicking will suppress the display of all audio items that do not concord with the line so clicked. For example, clicking on "The Beatles" in the performer field will suppress all items that were not performed by this group. In fact, this also means that the number of dimensions of the space of the audio items is diminished by at least one. This also means that after a single such selection, the number of audio items that may still be selected can be larger than one. Further selecting by the mouse with respect to one or more other attributes may effectively restrict to displaying only one item. As shown, the number of attributes filled in for this particular item is less than fifteen, either because not all specifiers of the database were filled in completely, or through natural causes. For example, certain music does not have a solo instrument. Apparently, the selection of FIG. 5 has been made by selecting only a single title.

If the selection has narrowed down to one single item, various effectivity control buttons become active, which has been indicated by highlighting thereof. As an alternative to the selecting of the item according to the above, part of the title of an audio item to be found has been typed in field 61, for effecting a content-addressing of the item, rather than selecting according to the attributes. In the embodiment, searching is done on the full title; it is clear that certain words may occur quite frequently in titles. Field 61 may further be used for displaying the full title of the audio item, whereas field 72 only accommodates the most striking part of the title. Button 62 controls the adding of the selected item to the compilation, which clearly has been effected already. Button 64 controls the rendering of a sample of the selected item; this may be the initial or other part that is useful for quick referencing. Button 60 resets the system to the format of FIG. 4. Button 66 removes all items from the compilation list. Button 70 allows to store the result of the compilation operation: the user is thereupon prompted to give the compilation a name. Button 68 is used to remove a particular item from the compilation.

Various extensions to the presentation system of FIGS. 4, 5 are feasible. The number of attributes can be made greater or smaller. Extra attributes could relate to the type of beat, the speed of the music, the language of the song, the arrangeur, the location of the original recording, the live vs studio vs rehearsal character of the music, the vocal vs instrumental character, and possibly others. The system could comprise a shell that would allow an advanced user to select, or even to specify attributes to be used for the selection. The system could allow to enter a new audio item at an arbitrary position in the compilation sequence. The system can be extended to let live items be introduced into the compilation immediately upon reception by broadcast or the like. The translation of the idea to video or mixed storage is straightforward.

Figure 6:
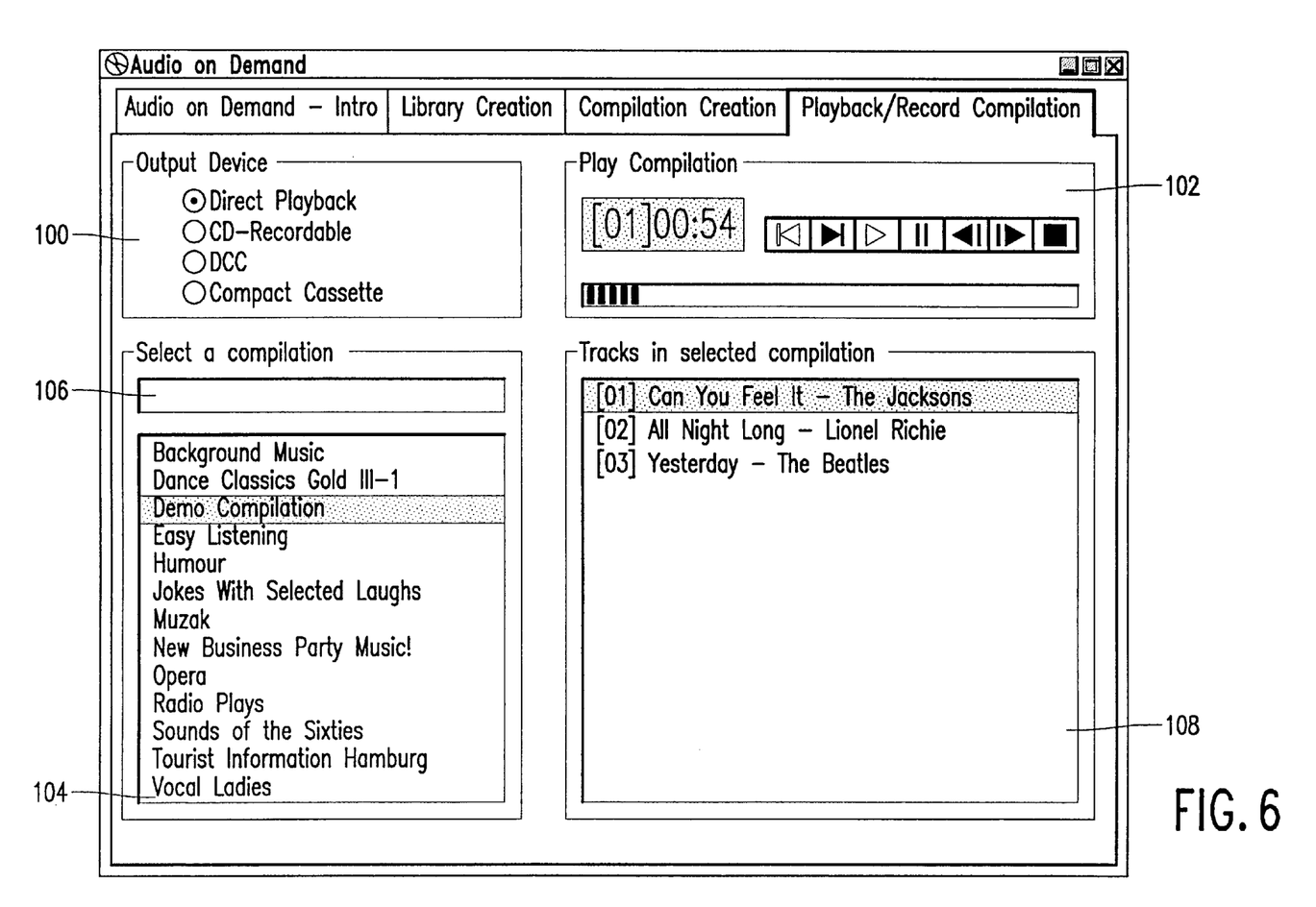
FIG. 6, a layout example of a "compilation playback/recording tab"

FIG. 6 is a layout example of a compilation playback/recording tab. Of the four selectors at the top of the Figure, now the last one has been made active. Field 100 selects the output device, that may be direct playback, CD-recordable, DCC or Compact cassette. Field 102 displays a digital time, a linear semi-analog time, and various controls that are standard in audio recording, such as play, stop, previous track, fast forward and the like. Field 104 displays the names of the actual compilations that are present in the system; as shown, one thereof has been selected by mousepointing. If the number of such compilations is greater, a scroll mechanism may be provided. Additionally, field 106 can be typed in for associatively searching through the compilations. Field 108 displays the successive tracks that are present in the selected compilation. Again, a selection has been made by mousepointing. Such may also be effected by typing in field 106, although not in this embodiment. The embodiment may be extended by various effectivity control elements for terminating the actual compilation, for going to the next compilation, and so on. As a particularly distinguishing feature the system upon each activation of the effectivity control buttons outputs a particular individual sound. This may be a standard sound for each such button, or rather pertain to a greater or smaller repertoire.

Figure 7:
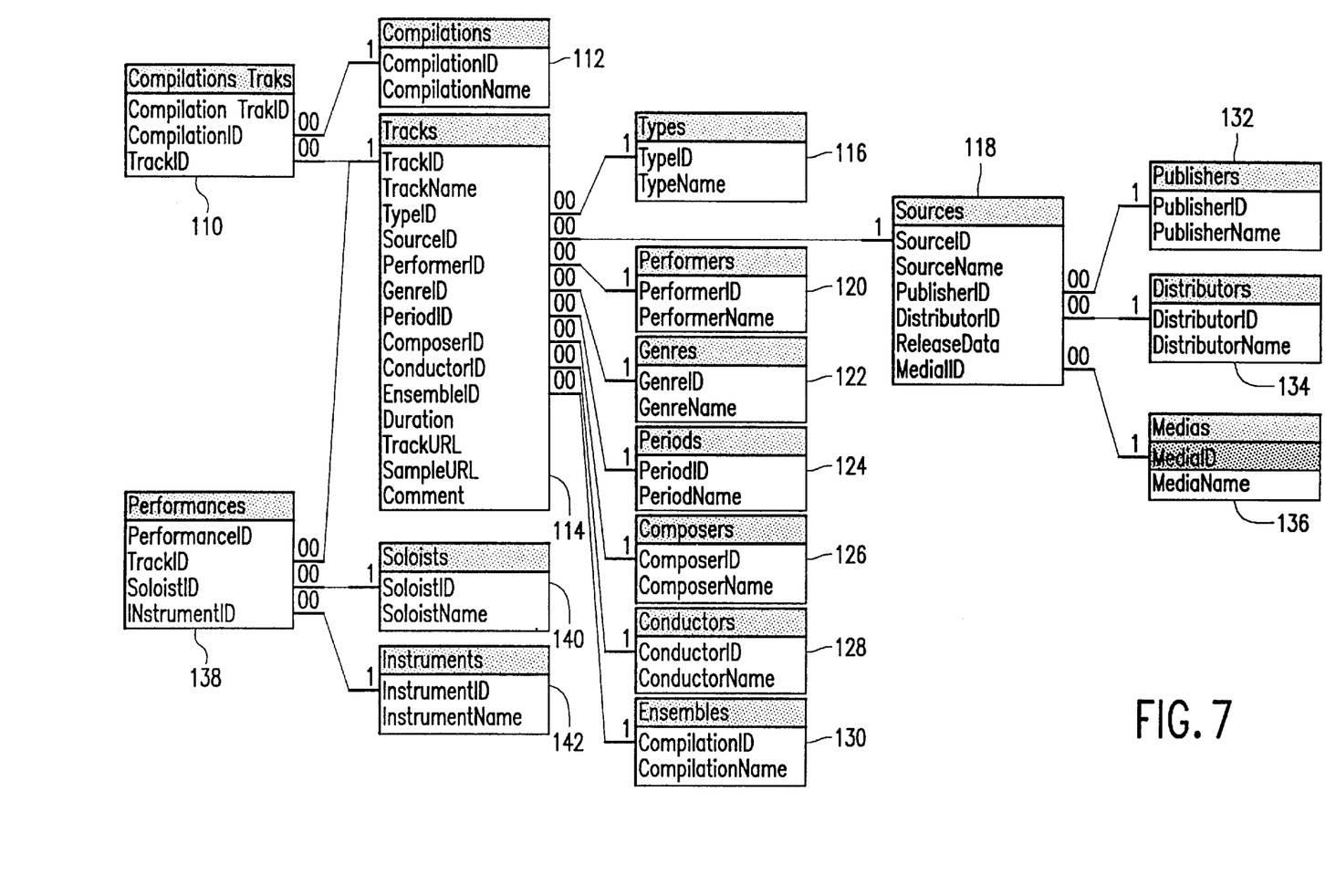
FIG. 7, an exemplary database structure.

FIG. 7 illustrates an exemplary database structure. Block 110 lists the Compilation Tracks. Therein, each Compilation Track Identifier points to one or more Compilation Identifiers, and to a Track Identifier. Block 112 lists the Compilations; therein, each Compilation has a Compilation Identifier, and a Compilation Name. Block 114 lists the Tracks. Therein, each track has a Track Identifier, a Track Name, a Type Identifier, a Source Identifier, a Performer Identifier, a Genre Identifier, a Period Identifier, a Composer Identifier, a Conductor Identifier, an Ensemble Identifier, a Duration specifier, a Track URL that specifies various technical aspects of the stored information, a Sample URL that specifies various technical aspects on the level of a stored sample, and a Comment field of restricted length.

Block 116 lists the Track, in particular, a Track Identifier and a Track Name. Block 118 lists the Source, and in particular, the Source Identifer, the Source Name, the publisher Identifier, the Distributor Identifier, the Release Date and the Media Identifier. Block 120 lists the Performer, and in particular the Performer Identifier and the Performer Name. Block 122 lists the genre, and in particular the Genre Identifier and the Genre Name. Block 124 lists the Period, and in particular the Period Identifier and the Period Name. Block 126 lists the Composer, and in particular the Composer Identifier and the Composer Name. Block 128 lists the Conductor, and in particular the Conductor Identifier and the Conductor Name. Block 130 lists the Ensemble, and in particular the Ensemble Identifier and the Ensemble Name. Block 132 lists the Publisher, and in particular the Publisher Identifier and the Publisher Name. Block 134 lists the Distributor, and in particular the Distributor Identifier and the Distributor Name. Block 136 lists the Media, and in particular the Media Identifier and the Media Name.

Block 138 lists the Performance and in particular, the Performance Identifier, the Track Identifier, the Soloist Identifier and the Instrument Identifier. Block 138 points to block 114. Further, block 140 lists the Soloist, and in particular the Soloist Identifier and the Soloist Name. Further, block 142 lists the Instrument, and in particular the Instrument Identifier and the Instrument Name.

Figure 8:
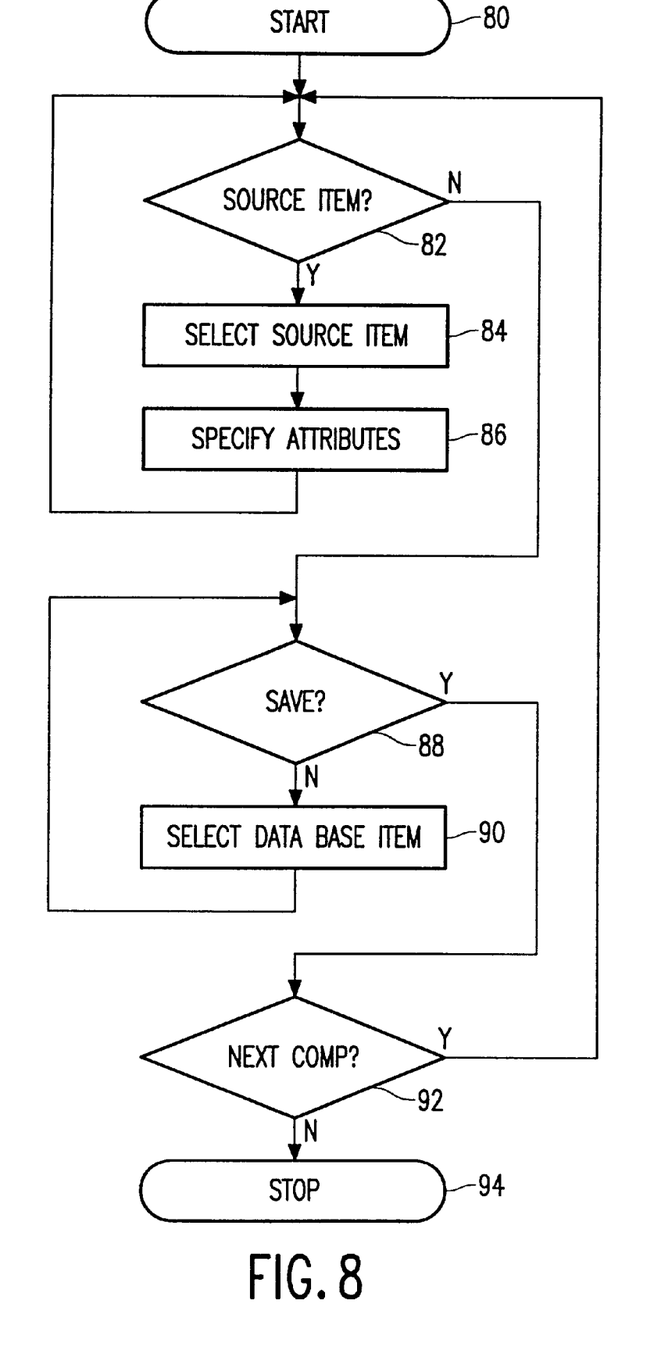
FIG. 8, a procedural flow chart.

FIG. 8 is a procedural flow chart. In block 80, the system is initialized, storage is claimed, and a first screen displayed. In block 82, the system detects whether a new source item must be added to the database. In block 84 the source, and if applicable, the location within the source is selected, and the item is transferred or copied into the database. If applicable, a sample thereof is taken for storage into the data disc and into a mass storage device, whereas the remainder, or all of the item is stored in mass storage background tape. In block 86 the attributes are specified in a display format not shown for brevity. As recited, the sequence of specifying, and the leaving out of certain specifiers is more or less arbitrary. If ready with the item, the system reverts to block 82.

If no source item need be specified according to block 82, the system goes to block 88 and detects whether a compilation must be saved. If no, in block 90 a database item is selected in parallel over various attributes that allow such selecting on a uniform level as extensively discussed with reference to FIGS. 4, 5. This may proceed several times through cycling the loop 88+90. If the saving operation has however been implemented, the system detects in block 92, whether further compilation-directed activities are necessary. If yes, the system reverts to block 82. If no, the operation is terminated, and the hardware and software facilities are relinquished.

We claim:

1. A method for visual user-presentation of a compilation system for multiple audio and/or visual items, said method comprising the steps of:

associating the items with various attributes that each specify a category, a value, or a label, for through selection amongst the items producing a compiled subset of items;

effecting said presentation multidimensionally in parallel over said various attributes, that each allow said selection therein on a uniform level, for through each selection suppressing presentation of items that discord with the actual selection, so that each selection diminishes the multidimensionality of said presentation; and displaying a selection of effectivity controls.

2. A method as claimed in claim 1, wherein said presentation is invariant against an interchange of the actual sequence of a particular set of sequential selections.

3. A method as claimed in claim 1, and allowing selection by pointing as well as through associative search.

4. A method as claimed in claim 1, wherein said categories include content categories, personal categories, as well as organizational categories.

5. A method as claimed in claim 1, wherein said presentation is in the form of a matrix of elements that each allow displaying of a uniform number of attribute instances.

6. A method as claimed in claim 1, wherein said presentation further comprises the step of highlighting attribute instances of a uniquely selected item.

7. A method as claimed in claim 1, further comprising the step of providing a shell that allows a user to amend said presentation.

8. A method as claimed in claim 1, wherein said effectivity controls are associated with specific individual sounds.

9. A device for visual user-presentation of a compilation for multiple audio and/or visual items, said device comprising:

associating means associating items with various attributes that each express a category, a value, or a label, for through selection amongst the items producing a compiled subset of items, presentation means that are multidimensionally effective in parallel over said various attributes, whilst offering selection facilities that each allow said selection therein on a uniform level;

suppression means for through each selection suppressing presentation of items that discord with the actual selection, so that each selection diminishes the multi-dimensionality of said presentation; and display means for displaying a selection of effectivity controls.

10. A device as claimed in claim 9, said device being based on a two-level storage of said items, in that a relatively small part of each respective item is stored in foreground storage for relatively fast outputting that part to a user as compared to background storage.

11. A device as claimed in claim 9, further comprising presentation means for presenting with respect to a single said item for inclusion in a selection database various specifier data pertaining to associated attributes.

* * * * *